June 21, 1966   E. SCHLOSSAR   3,257,593
SELF-OSCILLATORY COMMUNICATION SYSTEM FOR D.C. MOTOR
Filed Sept. 5, 1962   2 Sheets-Sheet 1
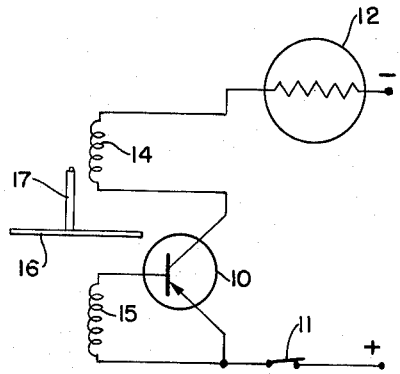
FIG. 1
FIG. 2
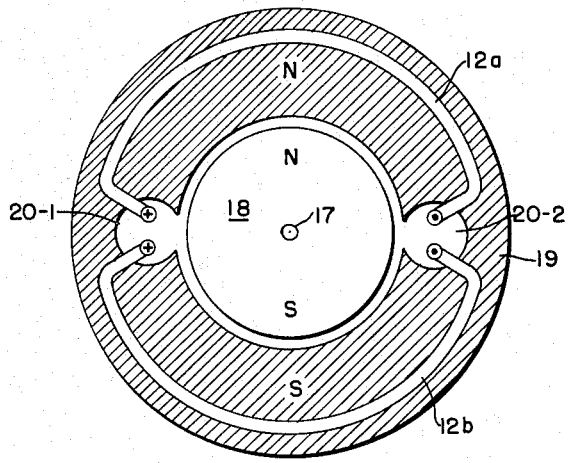
FIG. 3
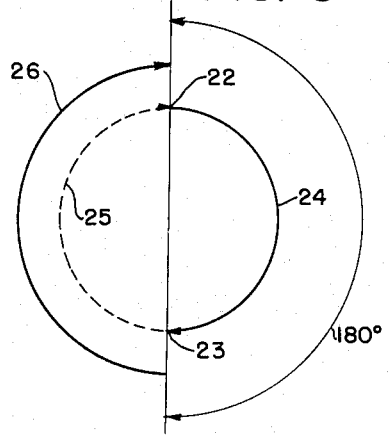
FIG. 4
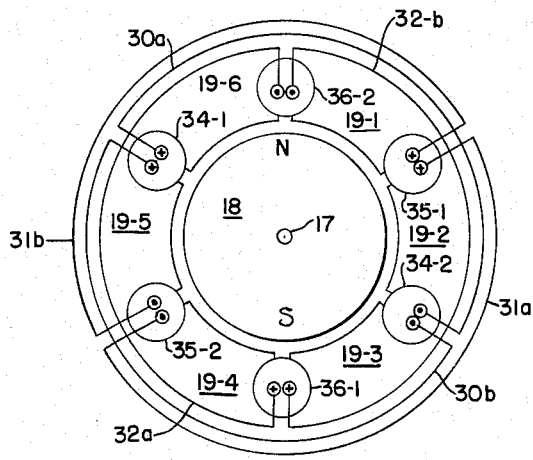
FIG. 5
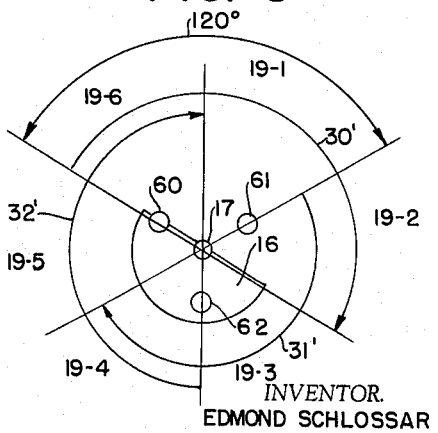
INVENTOR.
EDMOND SCHLOSSAR
BY
*Darby & Darby*
ATTORNEYS June 21, 1966          E. SCHLOSSAR          3,257,593
SELF-OSCILLATORY COMMUNICATION SYSTEM FOR D.C. MOTOR
Filed Sept. 5, 1962          2 Sheets-Sheet 2
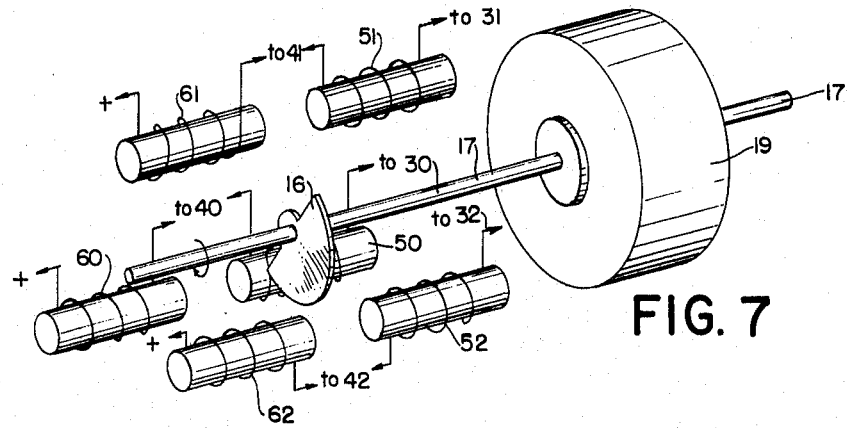
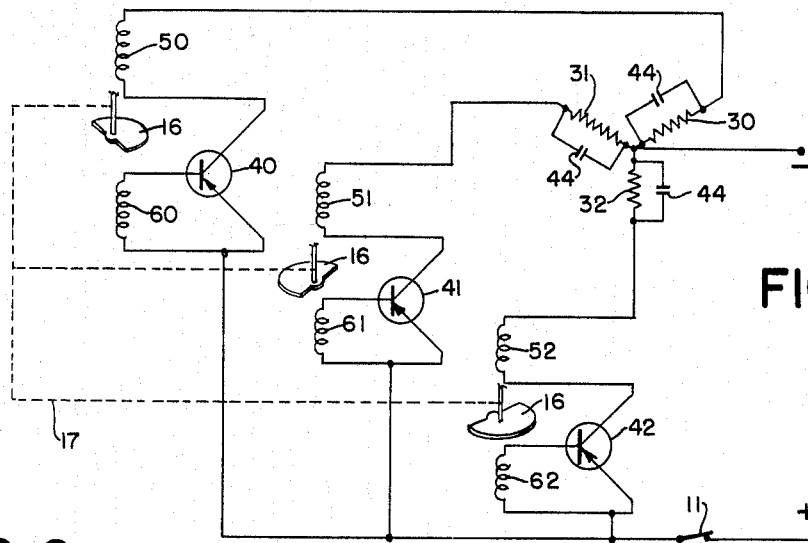
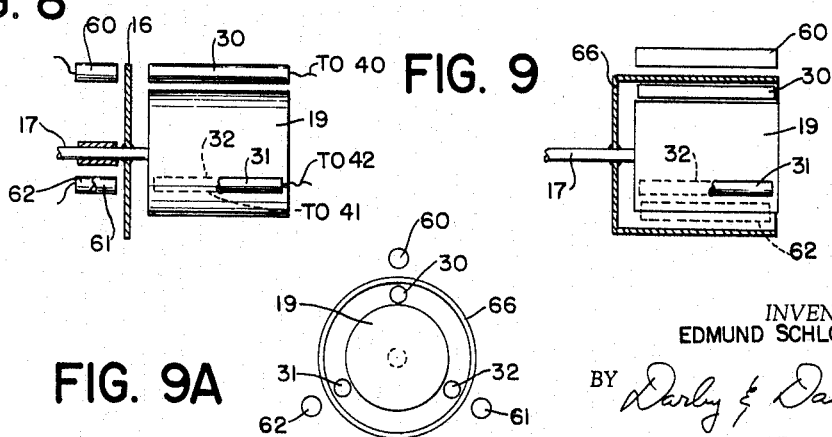
INVENTOR.
EDMUND SCHLOSSAR
BY Darby & Darby
ATTORNEYS

United States Patent Office 3,257,593
Patented June 21, 1966

3,257,593
SELF OSCILLATORY COMMUNICATION
SYSTEM FOR D.C. MOTOR
Edmund Schlossar, Berlin, Germany, assignor, by mesne assignments, to General Electric Company, Bridgeport, Conn., a corporation of New York
Filed Sept. 5, 1962, Ser. No. 221,574
5 Claims. (Cl. 318—138)

This invention relates to electric motors and more particularly to a motor which is operated from a source of direct current electrical energy without the use of an electro-mechanical commutator.

As is well known in the art, motors which are operated from a source of direct current voltage are usually provided with some type of a commutator. The purpose of the commutator is to supply the appropriate winding of the rotor of the motor with current as that rotor winding reaches a predetermined position, called the neutral plane, so that continuous rotation of the rotor may be sustained in one direction. A conventional type commutator is an electro-mechanical device which is carried by and rotates with the rotor and the current to be supplied to the rotor windings is applied to the commutator by stationary brushes, or other suitable devices, which are electrically connected to the power source. These brushes are in frictional contact with the commutator as it rotates. Because of the high rotational speed of the rotor, the commutator and the brushes are subject to a considerable amount of wear which eventually necessitates the replacement of one or both of these elements. Further, these elements also produce other disadvantageous electrical effects, such as sparking and electrical noise, which reduce the effectiveness of the motor. Therefore, as a general proposition, it would be highly desirable to eliminate the use of the commutator and brushes in a motor of the direct current operated type in order to do away with both the electrical and mechanical disadvantages introduced thereby.

In the past, attempts have been made to operate motors from a source of a direct current energy without using a commutator. This has been particularly true since the advent of the transistor and other similar types of semiconductor switching devices which are capable of operating from a direct current power source. In one type of commutatorless motor heretofore known in the art, the switching device which supplies current to the motor windings is controlled by providing the motor with an auxiliary pickup coil which is connected to the control electrode of the device. An auxiliary permanent magnet is mounted on another part of the motor, for example, the rotor shaft, so that there is relative motion between the pickup coil and the magnet. Each time the magnet is moved past the pickup coil, a voltage pulse is induced in the coil. When this pulse is applied to the control electrode of the switching device, it makes the device conduct and produce a pulse of current. This pulse of current is applied to a connected winding on the rotor or stator of the motor and it produces rotation of the rotor relative to the stator by conventional motor action.

From the above description, it should be clear that this type of prior art commutatorless motor is not self-starting. This is so because there must be relative rotation between the auxiliary pickup coil and the magnet before a voltage control pulse can be produced to make the switching device conduct and supply current to the winding. Therefore, in order to make the motor operate, it is necessary to provide some type of external electrical or mechanical arrangement for initially starting the motor. Because of the necessity of providing the external starting arrangement, many of the advantages gained by eliminating the commutator are lost. Thus, there is no substantial net gain for this type of motor in either construction cost or operating efficiency.

In the present invention, a motor of the commutatorless type which operates from a direct current power supply source is also provided. However, this motor overcomes many of the disadvantages of prior art motors in that it is self-starting, i.e. the initial motor action is produced without the use of any external electrical or mechanical apparatus. Further, the motor of the present invention is also capable of continuous rotation in one direction after it has been started.

In accordance with the invention, current from a direct current source is supplied to the stator windings of the motor through one or more switching devices which are operated as oscillators. The switching devices are electrically connected to the stator windings in a manner which makes them self-oscillatory, thereby making the motor self-starting. In order to prevent current from being applied to the motor windings when the rotor is improperly positioned with respect to the stator to obtain rotation in the desired direction, an arrangement is provided for stopping the self-oscillatory action of the switching device at these times. By doing this, the possibility of having rotor motion first in one direction and then in the other is eliminated.

In a preferred form of the invention, a plurality of self-oscillating transistors are used to supply current to a like plurality of windings spaced equi-angularly around the stator of the motor. The rotor carries a suitable means, such as a shield, for stopping the oscillation of the transistors at the proper times thereby preventing current from being applied to the windings and causing the motor to oscillate back and forth rather than turn in one direction. Therefore, the present invention provides a motor which can be directly operated from a direct current source, the motor having no commutator and being self-starting. This arrangement provides many electrical and mechanical advantages which make the motor of the present invention extremely useful in applications where other direct current operated motors are only partially successful. Further, the whole arrangement is relatively simple in form, and capable of trouble free operation for prolonged periods of time.

It is therefore an object of this invention to provide a motor which does not use a commutator which is operable from a source of direct current.

Another object of the invention is to provide a self-starting direct current operated, commutatorless motor.

Still a further object of the invention is to provide a motor without a commutator which is operated from a source of direct current through a plurality of self-oscillating semiconductor devices.

Yet a further object of the invention is to provide a self-starting, commutatorless motor operated from a source of direct current by a plurality of self-oscillating semiconductor devices, the motor carrying suitable means to prevent the self-oscillation of the semiconductors at predetermined times.

A further object of the invention is to provide a self-starting, commutatorless motor operated from a direct current supply source by a plurality of self oscillating devices in which the motor carries a shield for stopping the oscillation of a particular device at the proper time.

Another object of the invention is to provide a motor operable from a source of direct current, the motor being self-starting, having no commutator and being capable of sustained rotation in one direction.

Other objects and advantages of the present invention will become more apparent upon reference to the following specification and annexed drawings in which:

FIGURE 1 is a schematic diagram of a circuit showing various features of the invention;

FIGURE 2 is an end sectional view of a motor operated by a single self-oscillating device;

FIGURE 3 is a diagram showing the rotational motion of the rotor under several conditions;

FIGURE 4 is on end view of a motor having three stator windings which is operated by three self-oscillating devices;

FIGURE 5 is a diagram showing the rotational operation of the motor of FIGURE 4;

FIGURE 6 is a schematic diagram of the current supply circuit for a motor having three stator windings;

FIGURE 7 is a perspective view, partially in diagrammatic form, of a preferred embodiment of the motor of FIGURE 4; and FIGURES 8, 9 and 9A are diagrams showing other arrangements for providing feedback coupling for the self-oscillating switching devices.

Referring to FIGURE 1, a transistor 10 is shown connected for supplying current from a direct current source (not shown) to one winding 12 of a motor (not shown). The transistor has its collector electrode connected through a coil 14 and the winding 12 to one terminal of the power supply source and its base electrode connected through a coil 15 and a switch 11 to the other terminal of the power supply. The emitter electrode is illustratively connected directly to the same power supply terminal as the base electrode. Of course, suitable biasing networks may be used on the base, emitter or collector electrodes, if desired. As shown, the transistor 10 is of the PNP type so that the collector electrode is connected to the negative terminal of the power supply and the base and emitter electrodes to the positive terminal. Of course, it should be recognized that NPN transistors can be used in which case the polarities of the power supply terminals would be reversed.

In FIGURE 1, the coils 14 and 15 are properly wound and coupled closely together. These coupled coils provide a positive feedback signal from the collector to the base electrodes so that the transistor 10 operates as an oscillator. The oscillations of the transistor 10 are self-induced immediately upon application of power to the respective electrodes of the transistor when switch 11 is closed because of the inherent operating characteristics of the transistor and the close coupling between the coils 14 and 15. The frequency of the oscillations produced by the circuit is dependent upon the values of the various circuit parameters, which may be adjusted in a manner well known in the art. It should be understood that other types of feedback coupling circuits may be used other than just the two coil arrangements of FIGURE 1. For example, the inventor can use inductive, capacitive or resistive feedback or any combination thereof, as is known in the art, to cause oscillation.

Because of the self-oscillating operation of transistor 10, the winding 12 of the motor is supplied with current immediately upon application of power to the circuit. This means that the motor starts up and begins to rotate instantaneously without the application of any starting force or starting current from an external source. The direction of rotation of the rotor of the motor is determined by the polarity of the current flowing through the winding 12 (i.e. whether an NPN or PNP transistor is being used and the direction of magnetization of the magnetic poles of the motor rotor opposite the stator windings. It should be understood that the current produced by the oscillating transistor 10 is of one polarity only but that it carries sinusoidally in magnitude between maximum and minimum values.

As is known from the theory of operation of direct current motors, if current of only one polarity is applied to a rotor stator winding of a motor which has no commutator for reversing the effective direction of the magnetic field, the rotor will turn 180° in one direction and then 180° in the other, thereby causing motor oscillation. This is due to the fact that after the magnetized poles of the rotor have turned 180° from their original position that unless the magnetic field is reversed the magnetic field conditions are such that the rotor will be stopped and then rotated back to its original position. In the present invention in order to assure that the rotor will turn only in one direction, the current from the switching device 10 is removed from winding 12 at the time when the rotor has reached the position where its magnetic poles would cause the rotation to be stopped and then reversed in direction. Further, no current is supplied to the winding during the 180° portion of the rotor's rotation when the conditions are unavailable for rotation in the original direction. This is accomplished, by preventing the transistor 10 from oscillating during the time of that 180° portion. In a preferred embodiment of the invention, this is done, without the use of any electro-mechanical switches, by interposing a suitable shield between the coils 14 and 15 to prevent the feedback coupling. This shield is shown diagrammatically at 16 and it is rotated by a shaft 17 which, in a preferred embodiment of the invention, is the rotor shaft. The shield is actually semi-circular in configuration to stop the oscillation of the transistor for only 180° and it is made of a suitable material such as aluminum which prevents magnetic coupling between the two coils when the shield is placed therebetween. The shield may be mounted on either the load end of the rotor shaft or on a shaft extending from the opposite end of the motor. The feedback coils 14 and 15 are located on or adjacent to the motor in a position so that the shield may pass therebetween.

FIGURE 2 shows an end view of a motor which is operated by the power supply circuit of FIGURE 1. The motor of FIGURE 2 has a stator frame 19, which is made of steel or some other similar material having good magnetic flux carrying properties, upon which is wound a single motor stator winding 12. The stator winding 12 is illustratively split into two sections 12a and 12b which are wound in two diametrically located slots 20–1 and 20–2 in the stator frame. It should be realized that the slots 20–1 and 20–2 extend the length (not shown) of the frame 19 and that a single stator winding such as winding 12, may be formed by any number of sections or layers which are placed in the two slots. The motor also has a two pole permanent magnet rotor 18 one of the poles being permanently magnetized in the north (N) and the other in the south (S) direction of magnetization.

As shown, stator winding section 12a is wound over the upper half of the stator frame 19, going from slot 20–1 to slot 20–2, and winding section 12b is wound over the lower half of the stator frame, also going from slot 20–1 to 20–2. The end of each of the winding sections 12a and 12b at the slot 20–1 is connected to the upper end of the coil 14 of FIGURE 1 or to the negative terminal of the power supply, depending upon the type of transistor being used and the direction of motor rotation desired. The end of each of the winding sections 12a and 12b in the slot 20–2 is connected to the opposite terminal, i.e. to the negative terminal of the power supply or to the upper terminal of the coil 14.

In order to explain the operation of the motor, consider that the rotor 18 is in the position shown in FIGURE 2, with its north pole opposite the top half of the stator frame, and that the shield 10 (not shown) is positioned so that the transistor will oscillate upon application of power to the circuit. When the switch 11 of the power supply circuit of FIGURE 1 is closed, the transistor oscillates and current flows in the winding sections 12a and 12b in the direction shown in FIGURE 2. The current flows in the winding sections into the drawing at the ends of the winding sections in slot 20–1, as shown by the arrow tails, and out of the same winding sections at slot 20–2, as shown by the dots. Current flow in the winding sections in these directions magnetize the stator frame 19 as shown in FIGURE 2, with the upper half being effectively a north pole (N) of magnetization and the lower half of the stator frame being a south pole (S). The pattern of magnetic lines of force produced by this magnetization of the stator frame reacts with the magnetized two pole rotor 18 to produce rotation of the rotor in a clockwise direction. The action of the motor, considered from a magnetic field point of view, is well known in the art and may briefly be described as the north pole of the upper portion of the stator frame repelling the rotor north pole and attracting the rotor south pole and the south pole of the stator frame attracting the rotor north pole and repelling its south pole. This magnetic field action produces rotation of the rotor for 180° in the clockwise direction when the winding current is in the direction shown. This rotation is shown diagrammatically in FIGURE 3 by the curve 24 and may be considered as the north pole of the motor rotor 18 starting from an upper initial rest point 22 and rotating to a lower rest point 23.

If the oscillator is still supplying current to the winding in the direction shown in FIGURE 2 when the rotor has turned 180° and reached the lower rest point 23, the upper half of the stator frame would still be a north pole. However, it would now be opposing the south pole of the rotor. Similarly, the lower half of the stator would still be a south pole but it would now be opposing the rotor's north pole. Under these conditions the rotor would turn in the opposite (counter-clockwise) direction thereby producing an oscillating condition which defeats the motor's operation. To prevent this, the shield 16 is used to stop the transistor from oscillating when the north pole of the rotor reaches the lower rest point 23 and for 180° thereafter. Since no current is applied to the winding 12 when the transistor is not oscillating, the stator frame cannot be magnetized. This prevents motor action from taking place.

It should be realized that if an oscillating motor is desired, then the circuit of FIGURE 1 can be used without the shield 16. Such a motor might be useful, for example, in a clock or for other similar uses.

In most cases, it is desired to have a motor which can rotates in the same direction for a full 360°. Therefore, the shield 16 is used to stop the transistor from oscillating during the 180° of the rotor rotation when the conditions are not proper for rotation in the desired direction. In order to make the rotor 18 of FIGURE 1 turn a full 360°, several things can be done. First of all, the second 180° of rotation from rest point 23 back up to initial rest point 22 can be obtained by allowing the motor to coast of its own momentum through that 180° portion. This is shown by the dotted line 25 of FIGURE 3. This coasting arrangement is not generally satisfactory since it considerably reduces the load which the motor can carry. As another choice, the motor is provided with a second set of stator windings connected to a second oscillating transistor. This second set of windings is spaced 180° from the winding 12 i.e. in the same slots but having the current applied thereto in a manner so as to magnetize the upper portion of the frame 19 to a south magnetization pole and the lower half of frame 19 to a north magnetization pole when the north pole of rotor 18 is opposite the bottom half of the stator frame. Here, the coils 14 and 15 for the two transistors would be spaced 180° apart and the shield 16 would alternately turn the two transistors on and off. This arrangement would turn the rotor the additional 180° when the second transistor is oscillating as shown by the solid line 26 of FIGURE 3. While the two winding arrangement is operative to produce 360° rotation, it should be pointed out that the two rest points 22 and 23, at which no current is supplied to either of the two stator windings, still exist. This still leaves the rotor to coast at these two points and the rotor therefore requires added power from the supply cricuit to overcome the loss of momentum. Hence, a two winding motor of this type does not realize maximum efficacy.

FIGURE 4 shows end view of a motor which operates without any rest points thereby completely eliminating any reliance upon the momentum of the rotor to sustain continuous rotation. This motor has three sets of stator windings which are spaced 120° apart around the stator frame and three oscillating power supply circuits (FIGURE 6), each of which is similar to the one circuit shown in FIGURE 1, for driving a respective stator winding. In FIGURE 4, the two pole rotor 18 rotates within a stator 19 which is divided into six segments 19–1, 19–2, . . . 19–6, by six slots spaced 60° apart around the stator frame. The two slots located on the frame opposite each other form the respective slot pairs 34–1 and 34–2, 35–1 and 35–2, and 36–1 and 36–2, and the respective stator windings 30, 31 and 32 are held in the respective slots 34, 35 and 36.

As before, each stator winding is split into two sections, respectively designated by the letters "a" and "b." The same winding notation is used as in FIGURE 2. The end of each winding section in slot 34–1, 35–1 and 36–1 is connected to one terminal of the power supply and the end of each winding section in slot 34–2, 35–2 and 36–2 is connected to the other terminal. This may be accomplished as shown in FIGURE 6.

In FIGURE 4, winding sections 30a and 30b go from slot 34–1 to slot 34–2 so that when current is applied to this winding in the direction shown, stator segments 19–6, 19–1 and 19–2 are magnetized as north pole and stator segments 19–3, 19–4 and 19–5 as south poles. Similarly, winding sections 31a and 31b are placed in the slots 35–1 and 35–2 so that when current is applied thereto stator segments 19–2, 19–3 and 19–4 are magnetized as north poles and segments 19–5, 19–6 and 19–1 as south poles. In the same manner, winding sections 32a and 32b are placed in the slots 36–1 and 36–2 so that when current is applied in the manner and direction shown, stator segments 19–4, 19–5 and 19–6 are magnetized as north poles and segments 19–1, 19–2 and 19–3 as south poles.

The motor windings, feedback coils and semicircular shield 16 are all arranged in the motor of FIGURE 4 so that current is applied to a particular winding 30, 31 or 32 to magnetize the stator segments each winding controls in the same direction of magnetization as the pole of the rotor that currently opposes these stator segments. This provides for continuous motor action and rotor rotation in the same direction. The switching devices the feedback coils and the shield are arranged so that every 120° of rotor rotation one switching device is energized and another is shut off. Each device is left oscillating for a period of 180° of the rotor's rotation after it has been energized. This sequential energization is carried out so that one pole of the rotor 18 is always opposite a stator segment which is magnetized in the same direction. This particular magnetized stator segment can be receiving magnetomotive lines of force from either one or two of the windings, the latter being the case, for example, when both windings 30 and 31 are energized in which case stator segment 19–2 receives the lines of force from both of these windings. Therefore, there is always the proper motor action to turn the rotor in the same direction continuously, without pause or rest points.

The effect of alternately applying current to the windings 30, 31 and 32 is shown in FIGURE 5. Starting first with current applied to winding 30 and with the north pole of the rotor 18 opposite segments 19–6 and 19–1, the north magnetization of stator segments 19–6, 19–1 and 19–2 moves the rotor 18 clockwise the 180° arc described by the line 30′. When the rotor north pole reaches the end of segment 19–2, current is removed from winding 30 by stopping the respectively connected switching device from oscillating. However, when the rotor north pole reaches the leading edge of segment 19–2, current is applied to winding 30 to magnetize segments 19–2, 19–3 and 19–4. This will turn the rotor an additional 180° as shown by the arc 31′. It should be noted that the last 60° of rotation caused by current in the winding 30 overlaps with the first 60° of rotation caused by current in the winding 31 so that motor action is always occurring. Therefore the motor will not come to rest. In the same manner, when the north pole of the rotor 18 reaches stator segment 19-4, the current applied to winding 32 moves the rotor the arc described by the line 32' over segments 19-4, 19-5 and 19-6. When the north pole of the rotor is opposite segment 19-6, current is again applied to winding 30 to start the complete cycle over. In this manner, continuous rotation of the motor in one direction is assured.

FIGURE 6 shows the power supply current for the three winding motor of FIGURE 4. The circuit has three transistors 40, 41 and 42 whose collector electrodes are connected to the respective stator windings 30, 31 and 32 through the respective coils 50, 51 and 52. These coils may be a part of each winding 30, 31 and 32 or an auxiliary coil connected to each of these windings. A capacitor 44 is connected across each winding 30, 31 and 32 to compensate for any phase shift produced by the inductive reactance of the winding. Each transistor also has a respective feedback coil 60, 61 and 62 connected in its base to emitter circuit. The respective pairs of coils 50–60, 51–61 and 52—62 are positioned so that the shield 16 may pass in a space between each pair to stop the feedback action and thereby stop the oscillation of the transistor.

The position of the shield 16 and the location of the feedback coils 50–60, 51–61 and 52–62 for the motor of FIGURE 4 are shown diagrammatically in FIGURE 5. It can be seen that the feedback coils for a respective winding are located at the leading edge of that winding in the direction of rotation of the shield 16. Hence, the coils 50–60 are between stator segments 19–5 and 19–6, coils 51–61 between segments 19–1 and 19–2 and coils 52–62 between segments 19–3 and 19–4. It should be understood that the coils 51, 52 and 53 are located under the respective coils 50, 51 and 52 of FIGURE 5 so that the shield 16 can pass between each pair of coils to stop the oscillation of the respectively connected transistor 40, 50 or 60. In the position of the shield shown in FIGURE 5, current has just been removed from winding 30 since the leading edge of the shield is just starting to pass between coils 50 and 60. Winding 31 is being energized and has been supplied with current for the preceding 60° of rotation of the shield 16. Winding 32 will be energized when the shield rotates another 60° at which time winding 30 will be de-energized and winding 31 energized. Thus it can be seen that the rotation of the shield 16 controls the operation of the three transistors 40, 41 and 42 to supply current to the respectively connected windings 30, 31 and 32 only at the proper times to assure rotation of the rotor in one direction.

It should be understood that the components for each transistor are selected so that the frequency of oscillation of each of the transistors is the same. In fact, the operation of the three transistors in close proximity to each other causes their frequencies and phases to lock. If desired, a phase correcting network may be connected in the collector circuits of two of the transistors to advance the phase of one current output by 120° and retard the phase of the other by 120° with respect to the uncorrected output. This is done so that the 180° maximum amplitude portion of the sinusoidal current waveform from the phase-locked transistors is applied to each winding at the proper time to obtain maximum motor action.

FIGURE 7 is a perspective-view showing the structure of the motor of FIGURE 4 and the feedback coils of the power supply circuit of FIGURE 6. The same reference numerals have been used in all three figures. One end of each coil 50, 51 and 52 is connected to a respective winding 30, 31 and 32 while the other end of each coil is connected to the collector electrode of the respective transistor 40, 41 and 42. Similarly, one end of each coil 60, 61 and 62 is connected to the base electrode of the respective transistor 40, 41 and 42 while the other end is connected to one of the power supply terminals. Feedback coupling is produced between each pair of coils 50–60, 51–61 and 52–62, except when the shield 16 passes therebetween to prevent the coupling action.

FIGURE 8 shows in diagrammatic form another arrangement for providing feedback coupling. Here, each of the windings 30, 31 and 32 has one of its ends directly connected to the collector of the transistor and the auxiliary coils 50, 51 and 52 are eliminated. The coils 60, 61 and 62, which are connected to the base electrodes of the transistors are shown located axially of the respective stator winding and are spaced so that the semi-circular shield 16 can pass between each pair of windings and coils to stop the feedback action.

In FIGURE 9, the coils 60, 61 and 62 are located opposite the windings 30, 31 and 32, or the auxiliary coils 50, 51 and 52 when they are used. Here the semi-circular shield is replaced by a semi-cylindrical shield 66 whose outer surface covers 180°. Therefore, as the shaft 17 rotates, the shield 66 alternately shuts off the oscillation of transistors 40, 41 and 42 by cutting off the feedback for the respective transistor. Operation of the motors of both FIGURES 8 and 9 is as otherwise described with respect to FIGURES 4–7.

Therefore it can be seen that a novel motor has been provided which can be operated from a direct current source without the need of an electro-mechanical commutator. The motor is self-starting and it can also rotate continuously in the same direction. Further, the motor can be constructed so that the rotor will turn without stopping at any point. Motors made in accordance with the principles of the present invention are safe in their operation, capable of long maintenance-free performance and operate with a relatively high efficiency. For example, the only power lost using the power supply circuit of the present invention, in addition to the normal motor losses, is the power dissipated across the feedback coils. This loss is slight and is more than compensated for by the elimination of the commutator.

It should be recognized that the principles of the present invention may be applied to a motor having any number of stator windings and self-oscillating switching devices. It is only necessary to properly locate these windings, the feedback coils and the shield with respect to the axis of the motor so that the switching devices are turned off at the proper times to prevent rotation of the rotor in the wrong direction. It should also be recognized that while a semi-circular shield is shown, that the exact angular arc of this shield will depend upon the number of windings, their angular location around the stator frame and the degree of overlap when current is being supplied to two windings to prevent the rotor from stopping. While a 60° overlap was described with respect to the motor of FIGURE 4, it should be understood that this may be varied as desired as long as some overlap is maintained to prevent the motor action from stopping.

While preferred embodiments of the invention have been described above, it will be understood that these are illustrative only, and the invention is limited solely by the appended claims.

What is claimed:

1. A motor operable from a source of direct current electrical energy comprising a rotor element and a stator element which are rotatable relative to each other, one of said elements having a magnetized portion and the other having an electrical winding, said elements producing motor action and relative rotation therebetween upon application of current to said winding, a switching device connected to said source of direct current energy and said winding, a first coil connected to said winding and said switching device and a second coil also connected to said switching device, said coils being electrically coupled together to cause said device to oscillate and supply current to said connected winding, the flow of current in said connected winding producing motor action and causing one of said elements to rotate in a first direction, a shield carried by said rotating element, said shield passing between the coils to prevent electrical coupling therebetween, thereby preventing said device from oscillating, said shield being shaped and located to prevent coupling for substantially 180° of the rotation of said one element or more when the motor action produced by current in the winding would cause said one element to rotate in a direction different from said first direction.

2. A motor as set forth in claim 1 wherein said shield is generally arcuate in shape.

3. A motor operable from a source of direct current electrical energy comprising a rotor element, a stator element, said stator having three electrical windings spaced respectively 120° apart around the axis of the stator, three oscillator means, means connecting a respective oscillator means to each winding including feedback coupling means for each oscillator means located axially of the stator for normally producing self-oscillation of each said oscillator means, said feedback coupling means being spaced 120° apart with respect to the axis of said stator, the current produced by the self-oscillation of each said oscillator means being applied to its respectively connected winding to produce motor action between the rotor and stator and rotation of said rotor, a rotatable shield for reacting with each said feedback means to prevent self-oscillation of the respectively connected oscillator means, said shield covering an angular sector of at least 180° but less than 240° thereby permitting at least one of said oscillator means to be oscillating at all times.

4. A motor as in claim 3 further comprising each said feedback coupling means including a pair of coils, means connecting each pair of coils between the input and output of a respectve oscillator means, and said shield is flat and rotatable between the two coils of each pair to prevent self-oscillation of the respectively connected oscillator means.

5. A motor operable from a source of direct current electrical energy comprising a rotor element and a stator element which are rotatable relative to each other, one of said elements having a magnetized portion and the other having a plurality of electrical windings, said elements producing motor action and relative rotation therebetween upon application of current to respective areas of said windings, a respective switching device connected to said source of direct current energy and each said winding, a first coil connected to each said winding and the switching device respectively connected to the winding and a second coil also connected to each said switching device, each pair of said first and second coils associated with a respective switching device being electrically coupled together to cause said device to oscillate and supply current to its connected winding, the flow of current in a winding producing motor action and causing one of said elements to rotate in a first direction, a shield carried by said rotating element, said shield successively passing between the two coils of each pair of coils to prevent electrical coupling therebetween thereby preventing the associated switching device from oscillating, said shield being shaped and located to successively prevent coupling between each pair of coils for substantially 180° of the rotation of said one element or more when the motor action produced by current in a winding would cause said one element to rotate in a direction different from said first direction.

References Cited by the Examiner

UNITED STATES PATENTS

| 2,980,839 | 4/1961 | Haeussermann | 318—138 |
| 2,986,684 | 5/1961 | Cluwen | 318—138 |
| 3,091,728 | 5/1963 | Hogan et al. | 318—138 |
| 3,134,220 | 5/1964 | Meisner | 318—138 X |
| 3,175,140 | 3/1965 | Hogan | 318—138 |

MILTON O. HIRSHFIELD, *Primary Examiner.*

S. GORDON, *Assistant Examiner.*